(12) United States Patent
Kim et al.

(10) Patent No.: US 12,007,730 B2
(45) Date of Patent: Jun. 11, 2024

(54) METHOD OF MANAGING DATA

(71) Applicant: Kevinlab Co., Ansan-si (KR)

(72) Inventors: Kyung Hak Kim, Suwon-si (KR); Sung Hwan Choi, Seoul (KR)

(73) Assignee: Kevinlab Co., Ansan-si (KR)

( * ) Notice: Subject to any disclaimer, the term of this patent is extended or adjusted under 35 U.S.C. 154(b) by 0 days.

(21) Appl. No.: 18/106,869

(22) Filed: Feb. 7, 2023

(65) Prior Publication Data

US 2023/0236556 A1 Jul. 27, 2023

(30) Foreign Application Priority Data

Dec. 7, 2021 (KR) .................. 10-2021-0173783

(51) Int. Cl.
*G06F 5/00* (2006.01)
*G05B 15/02* (2006.01)
(52) U.S. Cl.
CPC ............ *G05B 15/02* (2013.01); *G06F 5/00* (2013.01); *G05B 2219/2642* (2013.01)
(58) Field of Classification Search
USPC ........................................................ 700/275
See application file for complete search history.

(56) References Cited

U.S. PATENT DOCUMENTS

| 2016/0292233 A1* | 10/2016 | Wilkinson | ............ G06F 16/215 |
| 2019/0319642 A1* | 10/2019 | Abdellatif | ............ A61B 5/7257 |
| 2021/0357741 A1* | 11/2021 | Jha | ............ H04W 84/18 |

FOREIGN PATENT DOCUMENTS

| KR | 10-2014-0116619 A | 10/2014 |
| KR | 10-2126692 B1 | 7/2020 |
| KR | 10-2021-0034714 A | 3/2021 |
| KR | 10-2230281 B1 | 3/2021 |
| KR | 10-2253734 B1 | 5/2021 |
| KR | 10-2294800 B | 8/2021 |

(Continued)

OTHER PUBLICATIONS

Office Action issued in KR 10-2021-0173783; mailed by the Korean Intellectual Property Office on Jun. 29, 2022.

(Continued)

*Primary Examiner* — Emilio J Saavedra
(74) *Attorney, Agent, or Firm* — Studebaker & Brackett PC

(57) ABSTRACT

A method of managing data is proposed. The method includes collecting information, wherein detection values respectively matched to time points successive in time series are continuously collected, dividing sections, wherein a reference section is set, and remaining time points is divided into a correction section, calculating an equation, wherein a time point of the reference section and a detection value matched thereto are respectively set as a reference time point and a reference value, performing correction, wherein correction values calculated according to a time interval are calculated, verifying accuracy, wherein whether a ratio of the time points of the correction section to the time points is less than or equal to a preset allowable ratio is checked, and storing the data, wherein the reference value, equation, detection values or correction values, and correspondingly matched time points are stored as the data for the reference section and correction section.

10 Claims, 2 Drawing Sheets

(56) References Cited

FOREIGN PATENT DOCUMENTS

KR         2294800 B1 *  8/2021   .......... G06F 11/3079
KR     10-2321767 B1    11/2021

OTHER PUBLICATIONS

Office Action issued in KR 10-2021-0173783; mailed by the Korean Intellectual Property Office on Jul. 11, 2022.
"Decision to Grant" Office Action issued in KR 10-2021-0173783; mailed by the Korean Intellectual Property Office on Jul. 28, 2022.

* cited by examiner

METHOD OF MANAGING DATA

STATEMENT REGARDING NATIONALLY SPONSORED RESEARCH OR DEVELOPMENT

This invention was made with government support by the Korea Institute of Energy Technology Evaluation and Planning (KETEP) on the basis of financial resource from the Ministry of Trade, Industry & Energy, Republic of Korea in 2021, under Project No. 20212020900380. The Government has certain rights to the invention.

CROSS REFERENCE TO RELATED APPLICATION

The present application claims priority to Korean Patent Application No. 10-2021-0173783, filed Dec. 7, 2021, the entire contents of which is incorporated herein for all purposes by this reference.

BACKGROUND OF THE INVENTION

Field of the Invention

The present disclosure relates to a method of managing data.

Description of the Related Art

Recently, a building energy management system (BEMS) has been attracting attention for more efficient energy use in buildings. In particular, the introduction of the building energy management system was legislated into law for public institutions or buildings having more than a predetermined scale and constructed from 2017. However, in most buildings, energy that is consumed for air conditioning including cooling and heating accounts for more than half of the total energy consumed in a building, so the energy consumed for the air conditioning is a major management target of the building energy management system.

Meanwhile, in a building energy management system, various information such as temperatures or power usage of a building is detected and collected, and energy consumption of the building is managed on the basis of the collected information. Since the information collected in this way is used for energy management of the building, the amount of information on various environments or situations should be increased in order to more efficiently conduct the energy management of the building.

Meanwhile, the collected information is converted into data, stored in an edge server installed in the building, and then transmitted to the cloud at a predetermined time interval ΔT and stored therein. Meanwhile, when an amount of data transmitted from the edge server to the cloud increases, there occurs a problem in that a data communication load for this data is increased. However, when the amount of the data is decreased, as described above, efficient energy management of the building may become impossible. However, in the related art, just a technique for managing energy of a building simply on the basis of the collected information has been disclosed, and a technique for solving the above-described problem is not proposed.

DOCUMENTS OF RELATED ART

Patent Documents (Patent Document 1) Korean Patent No. 2321767 (Title: ENERGY DATA PREPROCESSING PLATFORM SYSTEM BASED ON DEEP LEARNING ALGORITHM)
(Patent Document 2) Korean Patent No. 2253734 (Title: POWER DEMAND MANAGEMENT SYSTEM FOR BUILDINGS)
(Patent Document 3) Korean Patent No. 2230281 (Title: BEMS FOR TOTAL CONTROLLING POWER EQUIPMENT)

SUMMARY OF THE INVENTION

The present disclosure is to solve the problems caused by the related art as described above, and an objective of the present disclosure is to provide a method of managing data, the method being configured to enable more efficient data management and allow control based on the data.

In an aspect of a method of managing data according to an exemplary embodiment of the present disclosure, the method includes: collecting information, wherein detection values respectively matched to time points successive in time series so as to be spaced apart by a preset time interval are continuously collected, dividing sections, wherein a reference section in which two or more time points among the time points are grouped is set, and remaining time points except for the time points of the reference section are divided into a correction section, calculating an equation, wherein any one time point of the time points of the reference section and a detection value at any one time point are respectively set as a reference time point and a reference value, and a relationship between the reference value and detection values at remaining time points of the reference section is derived by the equation calculated according to a time interval between the reference time point and the remaining time points of the reference section, performing correction, wherein correction values calculated according to a time interval between the reference time point and the time points of the correction section are calculated by substituting the reference value into the equation; verifying accuracy, wherein whether a ratio of the time points of the correction section, at which the detection values and the correction values are different to each other, to the time points is less than or equal to a preset allowable ratio is checked; and storing the data, wherein, when the ratio of the time points of the correction section at which the detection values and the correction values are different to each other to the time points is less than or equal to the allowable ratio, the reference value, the time point matched thereto, and the equation are stored as the data for the reference section, and the detection values or the correction values, and the time points matched thereto are stored as the data for the correction section.

In the aspect of the exemplary embodiment of the present disclosure, in the setting of the sections, the time points matched to two or more detection values having a same tendency according to the time interval of the time points may be grouped into the reference section.

In the aspect of the exemplary embodiment of the present disclosure, in the calculating of the equation, the detection value, at the time point, configured to be a most approximate value to an average value of the detection values of an entire time point, and the time point matched to the detection value, may be respectively set as the reference value and the reference time point.

In the aspect of the exemplary embodiment of the present disclosure, in the calculating of the equation, a start point or an end point may be set as the reference time point according to a ratio of the reference section with respect to the entire time point and respective time intervals between a start point and an end point among the time points and between the start point and the end point among the time points of the reference interval.

In the aspect of the exemplary embodiment of the present disclosure, the start point or the end point, which has a relatively wide interval between the start point and the end point, may be set as the reference time point.

In the aspect of the exemplary embodiment of the present disclosure, in the calculating of the equation, increase or decrease of the detection values with respect to the reference value may be calculated by the equation by using the number of time intervals from the reference time point of the time points as a variable.

In the aspect of the exemplary embodiment of the present disclosure, when the ratio of the time points of the correction section at which the detection values and the correction values are different to each other to the time points is greater than the allowable ratio, the performing of the correction may be repeatedly performed until the ratio of the time points of the correction section at which the detection values and the correction values are different to each other to the time points is less than or equal to the allowable ratio.

In the aspect of the exemplary embodiment of the present disclosure, in the performing of the correction, the number of time points of the correction section from which the correction values are calculated may be reduced by a preset ratio according to the number of repetitions.

In the aspect of the exemplary embodiment of the present disclosure, in the performing of the correction, the time points may be excluded from calculation of the correction values in an order of the time points, in the correction section, most spaced apart in the time series from the reference section.

In the aspect of the exemplary embodiment of the present disclosure, in the storing of the data, when the ratio of the time points of the correction section at which the detection values and the correction values are different to each other to the time points is less than or equal to the allowable ratio, the correction values and the time points respectively matched thereto, the remaining time points of the correction section except for the correction values and the time points respectively matched thereto, and the detection values at the remaining time points may be stored as the data for the correction section.

In the aspect of the exemplary embodiment of the present disclosure, the method of managing the data further includes restoring the data, wherein the time points and restored values at the time points may be calculated and restored from the data of the reference section and the correction section.

In the aspect of the exemplary embodiment of the present disclosure, in the restoring of the data, the reference value, the restored values calculated by inverse calculation by applying the equation to the reference value, and the time points respectively matched to the restored values may be restored in the reference section, the restored values calculated by the inverse calculation by applying the equation to the reference value and the time points respectively matched to the restored values may be restored in a part of the correction section, and the detection values and the time points respectively matched thereto may be restored in a remaining of the correction section.

In the method of managing the data according to the exemplary embodiment of the present disclosure, the data is stored by an equation calculated from a relationship between a single reference value and detection values to the reference value for a plurality of detection values at time points of a reference section, and the plurality of detection values at time points of a correction section is stored as correction values calculated by the equation. In particular, in the exemplary embodiment of the present disclosure, the method is configured to adjust the time points of the correction section in which the correction values are calculated so that a ratio of the time points at which the detection values and the correction values of the correction section match to each other is greater than or equal to an allowable ratio Rp. Therefore, according to the exemplary embodiment of the present disclosure, data management is performable so as to enable efficient control based on the data.

DETAILED DESCRIPTION OF THE INVENTION

Hereinafter, a method of managing data according to an exemplary embodiment of the present disclosure will be described in more detail with reference to the accompanying drawings.

Figure 1:
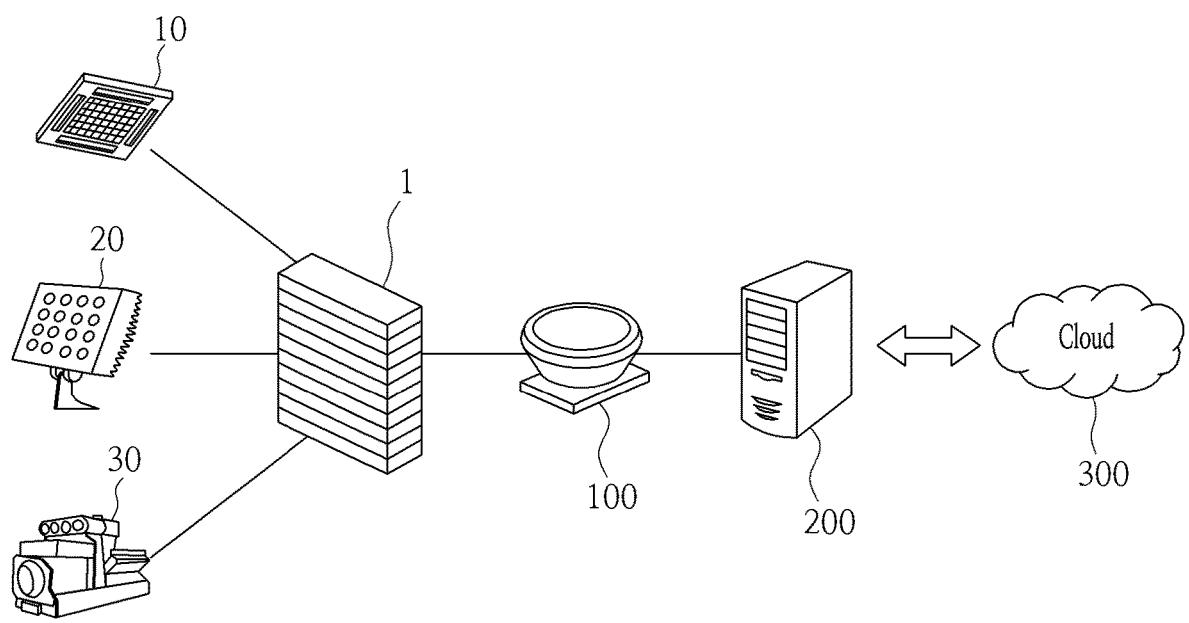
FIG. 1 is a configuration view schematically illustrating a system in which a method of managing data according to an exemplary embodiment of the present disclosure is implemented.
Figure 2:
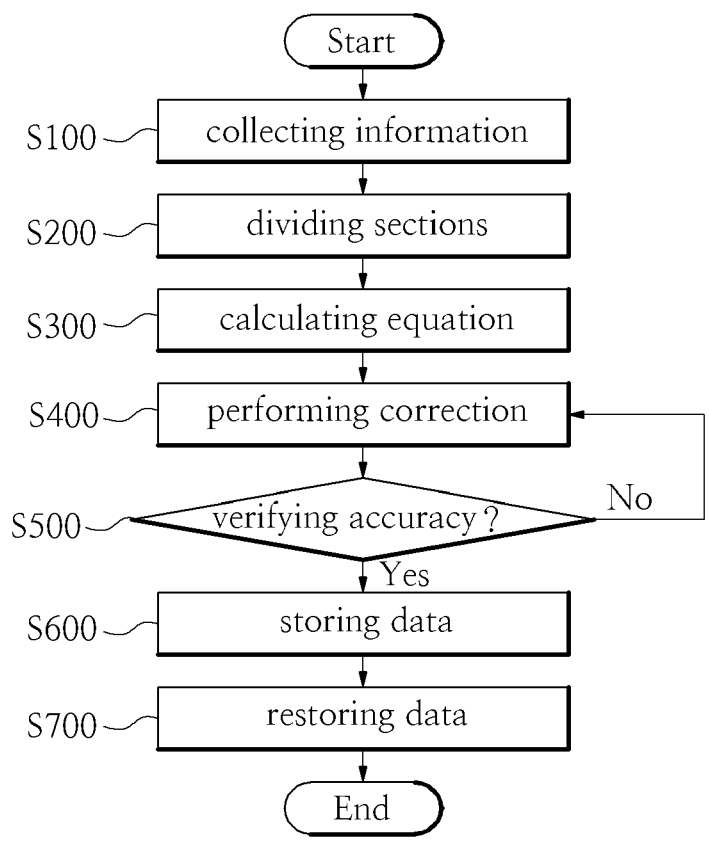
FIG. 2 is a flowchart illustrating the exemplary embodiment of the present disclosure.

FIG. 1 is a configuration view schematically illustrating a system in which the method of managing the data according to the exemplary embodiment of the present disclosure is implemented, and FIG. 2 is a flowchart illustrating the exemplary embodiment of the present disclosure.

First, referring to FIG. 1, in a building 1, there are various energy consumption sources such as an air conditioner 10, a lighting device 20, and other equipment 30. In addition, the building 1 is provided with a plurality of sensors 100 for detecting various information such as operations or states of such energy consumption sources or environmental factors affected by the operations of the energy consumption sources. For example, each sensor 100 may detect indoor temperatures of the building 1 in relation to the operation of the air conditioning device 10, and may detect indoor illuminance of the building 1 in relation to the operation of the lighting device 20. In addition, an edge server 200 and a cloud server 300 control the operation of the energy consumption source by reflecting the information detected by each sensor 100, and simultaneously store the information detected by each sensor 100. Practically, the information detected by each sensor 100 is converted into data and stored in the edge server 200, and such data is transmitted to the cloud server 300 at a preset time interval, and eventually the data is stored in the cloud server 300.

Hereinafter, data used in relation to air conditioning during energy management of a building among data related to various objects to be controlled, that is, a case in which each sensors 100 detects indoor temperatures of a building 1, will be described as an example.

Next, referring to FIG. 2, the method of managing the data according to the present exemplary embodiment includes step S100 of collecting information, step S200 of dividing sections, step S300 of calculating an equation, step S400 of performing correction, step S500 of verifying accuracy, step S600 of storing data, and step S700 of restoring the data.

More specifically, in step S100 of collecting the information, detection values Vd that are respectively matched to time-series consecutive time points T so to be spaced apart by a preset time interval ΔT are continuously collected. In the present exemplary embodiment, in step S100 of collecting the information, building indoor temperatures that each sensor 100 detects and collects for energy management of a building will be described as an example. For example, as shown in Table 1 below, the indoor temperatures of the building may be collected by setting a time interval ΔT to 10 minutes.

TABLE 1

| Time (T) | 0 | 1 | 2 | 3 | 4 | 5 | 6 | 7 | 8 | 9 |
|---|---|---|---|---|---|---|---|---|---|---|
| Detection value (Vd, ° C.) | 21 | 22 | 28 | 28 | 30 | 31 | 32 | 33 | 34 | 35 |

Next, in step S200 of dividing the sections, the time points T are divided into a reference section TB and a correction section TA. Here, the reference section TB is set by grouping two or more of the time points T, and the remaining time points Ta except for the time point Tb of the reference section TB are divided into a correction section TA. In particular, in step S200 of dividing the sections, two or more time points Tb respectively matched to detection values Vd having the same tendency according to the time interval ΔT of the time points T may be grouped into the reference section TB.

For example, in a case of [Table 1], from a time point T4 when 40 minutes have elapsed after the start of information collection to a time point T9 when 90 minutes have elapsed, there is provided a tendency that a time interval ΔT is increased by 1° C. Accordingly, as shown in Table 2 below, the time points T4 to T9 corresponding to the respective time intervals ΔT from 40 minutes to 90 minutes after the start of the information collection are partitioned into the time points Tb of the reference section TB, and the remaining time points T0 to T3 may be partitioned into the time points Ta of the correction section TA.

TABLE 2

| | Ta (Sa) | | | | Tb (Sb) | | | | | |
|---|---|---|---|---|---|---|---|---|---|---|
| Time (T) | 0 | 1 | 2 | 3 | 4 | 5 | 6 | 7 | 8 | 9 |
| Detection value (Vd, ° C.) | 21 | 22 | 28 | 28 | 30 | 31 | 32 | 33 | 34 | 35 |

In addition, in step S300 of calculating the equation, a reference time point Tc and a reference value Vc are set, and an equation is calculated. In step S300 of calculating the equation, any one time point Tb among the time points Tb of the reference section TB and a detection value Vd matched to the time point Tb are respectively set as the reference time point Tc and the reference value Vc. In addition, in step S300 of calculating the equation, a relationship between the reference value Vc and the detection value Vd at the remaining time points Tb of the reference section TB is derived by the equation calculated according to the time interval ΔT between the reference time point Tc and the remaining time points Tb of the reference section TB.

In particular, in the present exemplary embodiment, in step S300 of calculating the equation, the detection value Vd of the time point Tb that is a closest approximate value to an average value of the detection values Vd over the entire time point T and the time points Tb matched to the corresponding detection value Vd may be respectively set as a reference value Vc and a reference time point Tc. In addition, in step S300 of calculating the equation, increase or decrease of the detection value Vd with respect to the reference value Vc is calculated by the equation by using the number of time intervals ΔT from the reference time point Tc of the time point Tb as a variable.

Accordingly, in a case shown in Table 2, the average value of the entire time point T is 29.1° C., so the reference value Vc is set to 30° C., and a time point T4 at which a detection value Vd is 30° C. may be set as the reference time point Tc. In addition, according to the tendency of the detection values Vd in the reference section TB as described above, the above equation may be calculated as follows.

$$V_N = V_S + 1 \times N \text{ (N is the number of intervals from reference time point } T_C\text{)} \quad \text{(Equation)}$$

As another example, in step S200 of setting the sections, according to a ratio of the reference section TB with respect to the entire time point T and respective time intervals between a start point Ts and an end point Te among the time points T and between a start point Ts1 and an end point Te1 among the time points Tb of the reference interval TB, the start point Ts1 or the end point Te1 may be set as the reference time point Tc. In particular, in step S200 of setting the sections, the start point Ts1 or the end point Te1, which has a relatively wide interval between the start point Ts and the end point Te may be set as the reference time point Tc. Accordingly, in a case of [Table 3], a time point Tb that has elapsed for 40 minutes after the start of the information collection, and 30° C. may be respectively set as a reference time point Tc and a reference value Vc. This is to maximally reduce a magnitude of deviation between each correction value Va calculated as described later and the reference value Vc.

In addition, in step S400 of performing the correction, a correction value Va for a time point Ta of the correction section TA is selected according to the above equation. In the present exemplary embodiment, in step S400 of performing the correction, the reference value Vc is substituted into the above equation, whereby the correction value Va is calculated and generated according to a time interval ΔT between the reference time Tc and the time point Ta of the correction section TA. Accordingly, in a case of [Table 2], when the reference value Vc is substituted into the above equation and calculated, correction values Va are respectively calculated at time points Tb of the correction section TA, as shown in [Table 3] below.

TABLE 3

| | Ta (Sa) | | | | Tb (Sb) | | | | | |
|---|---|---|---|---|---|---|---|---|---|---|
| Time (T) | 0 | 1 | 2 | 3 | 4 | 5 | 6 | 7 | 8 | 9 |
| Detection value (Vd, ° C.) | 21 | 22 | 28 | 28 | 30 | 31 | 32 | 33 | 34 | 35 |
| 1st correction value (Va, ° C.) | 26 | 27 | 28 | 29 | — | — | — | — | — | — |

Meanwhile, in step S500 of verifying the accuracy, a ratio of the time points Ta of the correction section TA at which the detection values Vd and the correction values Va are different to each other to the time points T is checked whether or not the ratio is less than or equal to a set allowable ratio Rp. That is, in step S500 of verifying the accuracy, the ratio of mismatches between the correction values Va, at the time points Ta of the correction section TA, calculated by substituting the reference value Vc in the equation and the actually detected detection values Vd at the time points Ta of the correction section TA is checked.

Next, in step S600 of storing the data, the data for the reference section TB and correction section TA is stored. Substantially, the steps including step S200 of dividing the sections, step S300 of calculating the equation, step S400 of performing the correction, and step S500 of verifying the accuracy are performed in the edge server 200, and step S500 of verifying the accuracy may be performed by way of storing the data transmitted from the edge server 200 for the reference section TB and correction section TA in the cloud server 300. More specifically, in step S600 of storing the data, when a ratio of the time points Ta of the correction section TA at which the detection values Vd and the correction values Va are different to each other to the time points T is less than or equal to an allowable ratio Rp, the reference value Vc, a time point Tb matched to the reference value Vc, and the equation are stored as data for the reference section TB, and the detection value Vd or the correction value Va, and the time points Ta respectively matched to the detection value Vd or the correction value Va are stored as data for the correction section TA.

In addition, in the present exemplary embodiment, when the ratio of the time points Ta of the correction section TA at which the detection values Vd and the correction values Va are different to each other to the time points T is greater than the allowable ratio Rp, step S400 of performing the correction is repeatedly performed until the ratio of the time points Ta of the correction section TA at which the detection values Vd and the correction values Va are different to each other to the time points T is less than or equal to the allowable ratio Rp. For example, in step S400 of performing the correction, the number of time points Ta of the correction section TA from which the correction values Va are calculated may be reduced at a preset ratio according to the number of repetitions. In this case, in step S400 of performing the correction, time points may be excluded from calculation of the correction values Va in an order of the time points Ta, in the correction section TA, most spaced apart in time series from the reference section TB.

For example, when the allowable ratio Rp is set to 20%, in the case of [Table 3], all the detection values Vd of time points T0 to T3 among the time points Tb of the correction section TA do not coincide with the respective correction values Va thereof. Accordingly, in the case of [Table 3], since the ratio of the time points Ta of the correction section TA at which the detection values Vd and the correction values Va are different to each other to the time points T is 30% above the allowable ratio Rp by 10%, step S500 of performing the correction is repeatedly performed. That is, as shown in [Table 4] below, while excluding the time points in the order of the time points T0 to T3 most spaced apart in time series from the time point T4, which is the reference time point Tc, step S400 of performing the correction is repeatedly performed until the ratio of the time points Ta of the correction section TA at which the detection values Vd and the correction values Va are different to each other to the time points T becomes less than or equal to the allowable ratio Rp of 20%.

TABLE 4

| | Ta (Sa) | | | | Tb (Sb) | | | | | |
|---|---|---|---|---|---|---|---|---|---|---|
| Time (T) | 0 | 1 | 2 | 3 | 4 | 5 | 6 | 7 | 8 | 9 |
| Detection value (Vd, ° C.) | 21 | 22 | 28 | 28 | 30 | 31 | 32 | 33 | 34 | 35 |
| 1$^{st}$ correction value (Va, ° C.) | 26 | 27 | 28 | 29 | — | — | — | — | — | — |
| 2$^{nd}$ correction value (Va2, ° C.) | — | 27 | 28 | 29 | — | — | — | — | — | — |
| 3$^{rd}$ correction value (Va3, ° C.) | | — | 28 | 29 | | | | | | |

Accordingly, substantially, in step S600 of storing the data, when the ratio of the time points Ta of the correction section TA at which the detection values Vd and the correction values Va are different to each other to the time points T is less than or equal to the allowable ratio Rp, a correction value Va and a time point Ta matched to the correction value Va, the remaining time points Ta of the correction section TA except for the correction value Va and the time point Ta matched to the correction value Va, and the detection values Vd at the remaining time points Ta may be stored as data for the correction section TA.

Finally, in step S700 of restoring the data, the time points T and the restored values Vr at the time points T are calculated and restored from the data of the reference section TB and the correction section TA. That is, in step S700 of restoring the data, the reference value Vc, the restored values Vr calculated by inverse calculation by applying the above equation to the reference value Vc, and respective time points Tb matched to the restored values Vr are restored in the reference section TB. In addition, in step S700 of restoring the data, the restored values Vr calculated by the inverse calculation by applying the above equation to the reference value Vc and time points Ta respectively matched to the restored values Vr are restored in a part of the correction section TA, and the detection values Vd and the respective time points Ta matched thereto are restored in the remaining of the correction section TA. Accordingly, as shown in Table 5 below, the restored values Vr may be calculated.

TABLE 5

| | Ta (Sa) | | | | Tb (Sb) | | | | | |
|---|---|---|---|---|---|---|---|---|---|---|
| Time (T) | 0 | 1 | 2 | 3 | 4 | 5 | 6 | 7 | 8 | 9 |
| Detection value (Vd, ° C.) | 21 | 22 | 28 | 28 | 30 | 31 | 32 | 33 | 34 | 35 |
| 1$^{st}$ correction value (Va, ° C.) | 26 | 27 | 28 | 29 | — | — | — | — | — | — |
| 2$^{nd}$ correction value (Va2, ° C.) | — | 27 | 28 | 29 | — | — | — | — | — | — |
| 3$^{rd}$ correction value (Va3, ° C.) | | — | 28 | 29 | | | | | | |
| Restored value (Vr, ° C.) | 26 | 27 | 28 | 29 | 30 | 31 | 32 | 33 | 34 | 35 |

Therefore, in the case of managing the data according to the exemplary embodiment of the present disclosure, the data may be restored and used, so that the amount of the data stored in the cloud server 300 is reduced, and the accuracy with the detection values Vd is substantially greater than or equal to 70%. Naturally, the accuracy of the restored data compared to the detection values Vd may be increased or decreased by adjusting the above-described allowable ratio Rp.

Within the scope of the fundamental technical idea of the present disclosure, many other modifications are possible for those skilled in the art, as well as the scope of the present disclosure will have to be interpreted on the basis of the appended claims.

What is claimed is:

1. A system in which a method of managing data is implemented, the system comprising:
   a sensor (100) that performs an information collecting step (S100), in which the sensor (100) continuously collects detection values (Vd) respectively matched to time points (T) successive in time series so as to be spaced apart by a preset time interval (ΔT);
   an edge server device (200) that stores sensing data collected by the sensor (100) and performs a section dividing step (S200), in which the edge server device (200) sets a reference section (TB) in which two or more time points (Tb) among the time points (T) are grouped, and divides remaining time points (Ta) except for the time points (Tb) of the reference section (TB) into a correction section (TA); and
   a cloud server device (300) that receives the sensing data from the edge server device (200), stores the sensing data received from the edge server device (200), and controls, with the edge server device (200), an operation of a building having an energy consumption source including an air conditioner or a lighting device, based on the sensing data,
   wherein:
      the edge server device (200) further performs an equation calculating step (S300), in which the edge server device (200) respectively sets any one time point (Tb) of the time points (Tb) of the reference section (TB) and a detection value (Vd) at any one time point (Tb) as a reference time point (Tc) and a reference value (Vc), and derives a relationship between the reference value (Vc) and detection values (Vd) at remaining time points (Tb) of the reference section (TB), wherein the derived relationship is an equation calculated according to a first time interval (ΔT1) between the reference time point (Tc) and the remaining time points (Tb) of the reference section (TB);
      the edge server device (200) further performs a correction performing step (S400), in which the edge server device (200) calculates correction values (Va) calculated according to a second time interval (ΔT2) between the reference time point (Tc) and the time points (Ta) of the correction section (TA) by substituting the reference value (Vc) into the equation;
      the edge server device (200) further performs an accuracy verifying step (S500), in which the edge server device (200) checks whether a ratio of the time points (Ta) of the correction section (TA), at which the detection values (Vd) and the correction values (Va) are different to each other, to the time points (T) is less than or equal to a preset allowable ratio (Rp);
      the edge server device (200) further performs a data storing step (S600), in which when the ratio of the time points (Ta) of the correction section (TA) at which the detection values (Vd) and the correction values (Va) are different to each other to the time points (T) is less than or equal to the allowable ratio (Rp), the edge server 200 stores the reference value (Vc), the time point (Tb) matched thereto, and the equation as the data for the reference section (TB), and stores the detection values (Vd) or the correction values (Va), and the time points (Ta) matched thereto as the data for the correction section (TA);
      the edge server device (200) further performs a data restoring step (S700), wherein the edge server device (200) calculates and restores the time points (T) and restored values (Vr) at the time points (T) from the data of the reference section (TB) and the correction section (TA); and
      the edge server device (200) periodically transmits the data that is restored to a cloud server,
   wherein, in the data restoring step (S700), the edge server device (200) restores the reference value (Vc), the restored values (Vr) calculated by inverse calculation by applying the equation to the reference value (Vc), and the time points (Tb) respectively matched to the restored values (Vr) in the reference section (TB), restores the restored values (Vr) calculated by the inverse calculation by applying the equation to the reference value (Vc) and the time points (Ta) respectively matched to the restored values (Vr) in a part of the correction section (TA), and restores the detection values (Vd) and the time points (Ta) respectively matched thereto in a remaining of the correction section (TA).

2. The system of claim 1, wherein, in the section dividing step (S200), the edge server device (200) groups the time points (Tb) matched to two or more detection values (Vd) having a same increment or decrement according to a third time interval of the time points (T) into the reference section (TB).

3. The system of claim 2, wherein, in the equation calculating step (S300), the edge server device (200) respectively sets the detection value (Vd), at the time point (Tb), configured to be a most approximate value to an average value of the detection values (Vd) of an entire time point (T), and the time point (Tb) matched to the detection value (Vd), as the reference value (Vc) and the reference time point (Tc).

4. The system of claim 2, wherein, in the equation calculating step (S300), the edge server device (200) sets a start point (Ts1) or an end point (Te1) as the reference time point (Tc) according to a ratio of the reference section (TB) with respect to the entire time point (T) and respective time intervals between a start point (Ts) and an end point (Te) among the time points (T) and between the start point (Ts1) and the end point (Te1) among the time points (Tb) of the reference interval (TB).

5. The system of claim 4, wherein, in the equation calculating step (S300), the edge server device (200) sets the start point (Ts1) as the reference time point (Tc) when a first distance from the start point (Ts1) to the start point (Ts) and the end point (Te) is greater than a second distance from the end point (Te1) to the start point (Ts) and the end point (Te), and the edge server device (200) sets the end point (Te1) as the reference time point (Tc) when the second distance from the end point (Te1) to the start point (Ts) and the end point (Te) is greater than the first distance from the start point (Ts1) to the start point (Ts) and the end point (Te).

6. The system of claim 2, wherein, in the equation calculating step (S300), the edge server device (200) calculates increase or decrease of the detection values (Vd) with respect to the reference value (Vc) by the equation by using the number of time intervals (ΔTs) from the reference time point (Tc) of the time points (Tb) as a variable.

7. The system of claim 2, wherein, when the ratio of the time points (Ta) of the correction section (TA) at which the detection values (Vd) and the correction values (Va) are different to each other to the time points (T) is greater than the allowable ratio (Rp), the edge server device (200) repeatedly performs the correction performing step (S400) until the ratio of the time points (Ta) of the correction section (TA) at which the detection values (Vd) and the correction values (Va) are different to each other to the time points (T) is less than or equal to the allowable ratio (Rp).

8. The system of claim 7, wherein, in the correction performing step (S400), the edge server device (200) reduces the number of time points (Ta) of the correction section (TA) from which the correction values (Va) are calculated by a preset ratio according to the number of repetitions.

9. The system of claim 7, wherein, in the correction performing step (S400), the edge server device (200) excludes the time points (Ta) from calculation of the correction values (Va) in an order of the time points (Ta), in the correction section (TA), most spaced apart in the time series from the reference section (TB).

10. The system of claim 7, wherein, in the data storing step (S600), when the ratio of the time points (Ta) of the correction section (TA) at which the detection values (Vd) and the correction values (Va) are different to each other to the time points (T) is less than or equal to the allowable ratio (Rp), the edge server device (200) stores the correction values (Va) and the time points (Ta) respectively matched thereto, the remaining time points (Ta) of the correction section (TA) except for the correction values (Va) and the time points (Ta) respectively matched thereto, and the detection values (Vd) at the remaining time points (Ta), as the data for the correction section (TA).

* * * * *